US006850818B2

(12) United States Patent
Sabe et al.

(10) Patent No.: US 6,850,818 B2
(45) Date of Patent: Feb. 1, 2005

(54) ROBOT APPARATUS AND CONTROL METHOD THEREOF

(75) Inventors: Kohtaro Sabe, Tokyo (JP); Kenta Kawamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 53 days.

(21) Appl. No.: 10/451,331

(22) PCT Filed: Oct. 22, 2002

(86) PCT No.: PCT/JP02/10921

§ 371 (c)(1),
(2), (4) Date: Apr. 22, 2004

(87) PCT Pub. No.: WO03/035334

PCT Pub. Date: May 1, 2003

(65) Prior Publication Data

US 2004/0117063 A1 Jun. 17, 2004

(30) Foreign Application Priority Data

Oct. 22, 2001 (JP) ........................................ 2001-323259

(51) Int. Cl.[7] .......................... G05B 19/04; G05B 19/18
(52) U.S. Cl. ........................ 700/257; 700/245; 700/258; 700/259; 318/568.1; 901/1
(58) Field of Search ................................. 700/245, 246, 700/250, 252, 257–259; 706/23; 340/573.1; 342/357.1; 348/36; 382/165; 701/28, 182; 318/568.1; 901/1

(56) References Cited

U.S. PATENT DOCUMENTS

| | | | | |
|---|---|---|---|---|
| 6,151,571 | A | * | 11/2000 | Pertrushin .................... 704/209 |
| 6,226,401 | B1 | * | 5/2001 | Yamafuji et al. ............ 382/165 |
| 6,275,806 | B1 | * | 8/2001 | Pertrushin .................... 704/272 |
| 6,754,560 | B2 | * | 6/2004 | Fujita et al. ................. 700/245 |
| 2001/0020837 | A1 | | 9/2001 | Yamashita et al. | 
| 2002/0002464 | A1 | * | 1/2002 | Petrushin .................... 704/275 |
| 2003/0023444 | A1 | * | 1/2003 | St. John ................... 704/270.1 |
| 2003/0033145 | A1 | * | 2/2003 | Petrushin .................... 704/236 |

FOREIGN PATENT DOCUMENTS

| | | |
|---|---|---|
| JP | 9-81205 | 3/1997 |
| JP | 2001-157981 | 6/2001 |
| JP | 2001-188555 | 7/2001 |

OTHER PUBLICATIONS

Downs III, et al., IRNS: A system for telerobotic surgical mentoring, 1998, IEEE, pp. 182–186.*
Guerrouard, Voice control in the surgery room, 1989, IEEE, pp. 1–2.*
Foster et al., Voice recognition for the IBM 7535 Robot, 1989, IEEE, pp. 759–764.*
Lim et al., Multiple mobile robot interface using a low cost voice recognition chip, 1997, IEEE, pp. 402–407.*

* cited by examiner

Primary Examiner—Thomas G. Black
Assistant Examiner—McDieunel Marc
(74) Attorney, Agent, or Firm—Frommer Lawrence & Haug LLP; William S. Frommer

(57) ABSTRACT

A robot apparatus integrates individual recognition results received asynchronously and then passes the integrated information to a behavior module. Thus, handling of information in the behavior module is facilitated. Since information regarding recognized observation results is held as a memory, even if observation results are temporarily missing, it appears to an upper module that items are constantly there in perception. Accordingly, insusceptibility against recognizer errors and sensor noise is improved, so that a stable system that is not dependent on timing of notifications by recognizers is implemented. Thus, the robot apparatus integrates a plurality of recognition results from external environment and handles the integrated information as meaningful symbol information, allowing sophisticated behavior control.

16 Claims, 16 Drawing Sheets

ROBOT APPARATUS AND CONTROL METHOD THEREOF

TECHNICAL FIELD

The present invention relates to robot apparatuses and control methods therefor that allow autonomous behavior and realistic communication. Particularly, the present invention relates to an autonomous robot apparatus that is capable of recognizing external information such as image and sound and reflecting the information on its own behavior, and to a control method therefor.

More specifically, the present invention relates to robot apparatuses and control methods therefor in which a plurality of recognition results from external environment is integrated and handled as meaningful symbol information for controlling behavior. Particularly, the present invention relates to a robot apparatus and a control method therefor in which it is determined which flesh-colored region is a face and corresponds to which person, or which person has uttered this voice, etc., using more complex recognition results such as association with previously observed recognition results.

BACKGROUND ART

A machine apparatus that operates in a manner simulating operation of a human being by electric or magnetic effect is referred to as a "robot". The origin of the term robot is said to be the Slavic word "ROBOTA (slave machine)". In Japan, robots began to be commonly used in the late 1960s, and most of the robots were industrial robots for allowing automated and unmanned production works at factories, such as manipulators and carrier robots.

Recently, researches and developments relating to structures and stable gait control of legged mobile robots, such as pet robots that simulate physical mechanisms and operations of quadrupedal animals such as dogs, cats, and bears, and "humanoid" robots that simulate physical mechanisms and operations of bipedal orthograde animals such as human beings and monkeys, are in progress, and expectations for practical use have been raised. Although these legged mobile robots are less stable and suffer difficulty of attitude control and gait control compared with crawler robots, the legged mobile robots are advantageous in that flexible walking and running operations such as going up and down stairs and overcoming hurdles can be achieved.

An installed robot that is installed at a particular place, such as an arm robot, operates only in a fixed, local workspace, for example, for assembly and selection of parts. On the other hand, a mobile robot operates in an unlimited workspace; it is capable of freely moving along a predetermined path or without a particular path and performs a predetermined or arbitrary human task, and providing various services on behalf of a human, a dog, or other creatures.

A use of legged mobile robots is to perform various difficult tasks in industrial activities, production activities, etc. on behalf, for example, dangerous and difficult tasks such as maintenance work in nuclear power generation plants, thermal power generation plants, or petrochemical plants, transfer and assembly of parts in manufacturing factories, cleaning in high-rise buildings, rescue in fire sites, etc.

Another use of legged mobile robots is, rather than work assistance described above, closely related to life, i.e., "living together" with humans or "entertainment". A robot of this kind reproduces rich emotions loyally using an operation mechanism of a relatively intelligent legged mobile animal such as a human being, a dog (pet), or a bear, or using for limbs. Furthermore, in addition to loyally exhibiting operation patterns input in advance, the robot is also required to express vivid responses dynamically in accordance with words and attitude (e.g., "praise", "scold", "strike", etc.) of a user (or another robot).

In a conventional toy machine, relationship between user operations and responses is fixed, and operation of the toy cannot be modified in accordance with preference of a user. Thus, the user eventually becomes tired of the toy repeating the same operation.

In contrast, an intelligent robot that operates autonomously is capable of recognizing information of external environment and reflecting the information on its own behavior. That is, the robot determines its behavior by changing emotion model and instinct model based on input information such as sound, image, and sense of touch, thereby achieving autonomous thinking and operation control. That is, by preparing emotion models and instinct models, the robot is allowed to achieve realistic communication with humans at a higher level of intelligence.

In order to allow the robot to behave autonomously in accordance with change in environment, conventionally, behavior has been described by combinations of simple behavior descriptions such that a behavior is taken in response to information of an observation result. By mapping inputs to behaviors, functions such as randomness, internal status (emotion and instinct), learning, and growth are introduced, allowing expression of non-uniform, complex behaviors.

According to the, simple method of behavior mapping, however, for example, when a ball is lost from vision even for an instant during an operation of tracking and kicking the ball, since information regarding the ball is not held, a behavior for find the ball from scratch must be taken. Thus, recognition results are not used consistently.

Furthermore, the robot must determine which recognition result is associated with which result of previous observation when a plurality of balls is observed. Furthermore, in order to use more complex recognition results such as recognition of a face, recognition of flesh color, and recognition of voice, the robot must determine which flesh-colored region is a face and corresponds to which person, which person has uttered this voice, etc.

DISCLOSURE OF INVENTION

It is an object of the present invention to provide a favorable autonomous robot apparatus that is capable of recognizing information of external environment, such as image and sound, and reflecting the information on its own behavior, and also a control method therefor.

It is another object of the present invention to provide a favorable robot apparatus in which a plurality of results of recognition from external environment is integrated and handled as meaningful symbol information, allowing sophisticated behavior control, and a control method therefor.

It is another object of the present invention to provide a favorable robot apparatus that is capable of determining which flesh-colored region is a face and corresponds to which person, which person has uttered this voice, etc., using more complex recognition results such as association with previously observed recognition results, and a control method therefor.

The present invention, which has been made in view of the above objects, relates to a robot apparatus that operates autonomously in accordance with change in external environment, or a control method therefor, including:

one or more recognition means or steps for recognizing external environment;

target detecting means or step for detecting an item existing in the external environment based on recognition results by the recognition means for steps; and target storing means or step for storing target information relating to the item detected by the target detecting means or step.

The recognition means or steps allow recognition of, for example, speech, content of speech utterance by a user, color of an item, or a face of a user in the external environment.

The robot apparatus or the control method therefor according to the present invention may further include behavior controlling means or step for controlling own behavior of the robot apparatus based on the target information stored in the target storing means or step.

The target storing means or step stores results of recognition of the item by the recognition means or steps, and position and attitude information of the item, as target information.

At this time, the position and attitude information of the item is held by converting results of recognition in coordinate systems of the recognition means or steps into a fixed coordinate system based on the apparatus body of the robot apparatus, integration of information of a plurality of recognizers is allowed. For example, when the robot moves the neck, etc. and the attitude of a sensor changes, the position of the item as vied from an upper module (application) that controls behavior of the robot based on the target information remains the same.

Furthermore, target deleting means or step for deleting target information regarding an item that is not recognized for a predetermined period or longer by the recognition means or steps may be provided.

Furthermore, forgetting means for determining whether the target not recognized by the recognition means or steps resides within a range of recognition, and holding associated target information in the target storing means if the target resides outside the range while forgetting the associated target information in the target storing means if the target resides within the range, may be further provided.

Furthermore, target associating means or step for revealing relevance among target information with an assumption that the same or overlapping recognition results are information regarding the same item may be provided.

Also, target associating means or step for revealing relevance among target information with an assumption that results of recognition by two or more recognition means, coinciding or overlapping in position, are information regarding the same item.

Furthermore, the target storing means or step may add information of the same object, recognized later, and holds it together as single target information.

Furthermore, the robot apparatus or the control method therefor according to the present invention may further include event detecting means or step for detecting events that have occurred the external environment, based on results of recognition by the recognition means or steps, and event storing means or step for holding the events detected by the event detecting means or step, in order of time of occurrence.

The event detecting means or step may handle information regarding change in the external environment, such as recognized content of speech utterance, appearance and/or disappearance of an item, and own behavior of the robot apparatus, as events.

Furthermore, behavior controlling means or step for controlling own behavior of the robot apparatus based on event information stored may be further provided.

The robot apparatus or the control method therefor according to the present invention integrates a plurality of recognition results from external environment and handles it as meaningful symbol information, allowing sophisticated behavior control. Furthermore, the robot apparatus or the control method integrates individual recognition results that are received asynchronously and then passes the integrated information to a behavior module. Accordingly, handling of information in the behavior module is facilitated.

Accordingly, it is allowed to determine which flesh-colored region is a face and corresponds to which person, which person has uttered this voice, etc., using more complex recognition results such as association with previously observed recognition results.

Furthermore, the robot apparatus or the control method therefor according to the present invention stores information regarding recognized observation results as a memory. Thus, even if observation results are temporarily missing during autonomous behavior, it appears to an upper module such as an application for controlling behavior of the apparatus body that items are constantly there in perception. Accordingly, a stable system that is less susceptible to recognizer errors and sensor noise and that does not depend on timing of notifications by recognizers is implemented.

Furthermore, the robot apparatus or the control method therefor according to the present invention is allowed to determine its behavior using related information in an upper module such as an application since related recognition results are associated with each other. For example, the robot apparatus is allowed to retrieve a name of a person based on a calling voice, and is thus capable of responding to a greeting by saying "Hello, XXX."

Furthermore, since the robot apparatus or the control method therefor according to the present invention holds information regarding outside of the vision of a sensor instead of immediately forgetting it, even if the robot once lose sight of an item, the robot is able to find the item later.

Furthermore, in the robot apparatus or the control method therefor according to the present invention, even if information is insufficient from the viewpoint of a single recognizer alone, other recognition results sometimes compensate for the insufficiency, so that recognition performance of the system as a whole is improved.

Other objects, features, and advantages of the present invention will become apparent from the following description of an embodiment of the present invention and more detailed description with reference to the accompanying drawings.

BEST MODE FOR CARRYING OUT THE INVENTION

Now, an embodiment of the present invention will be described with reference to the drawings.

A. Construction of a Legged Mobile Robot

Figure 1:
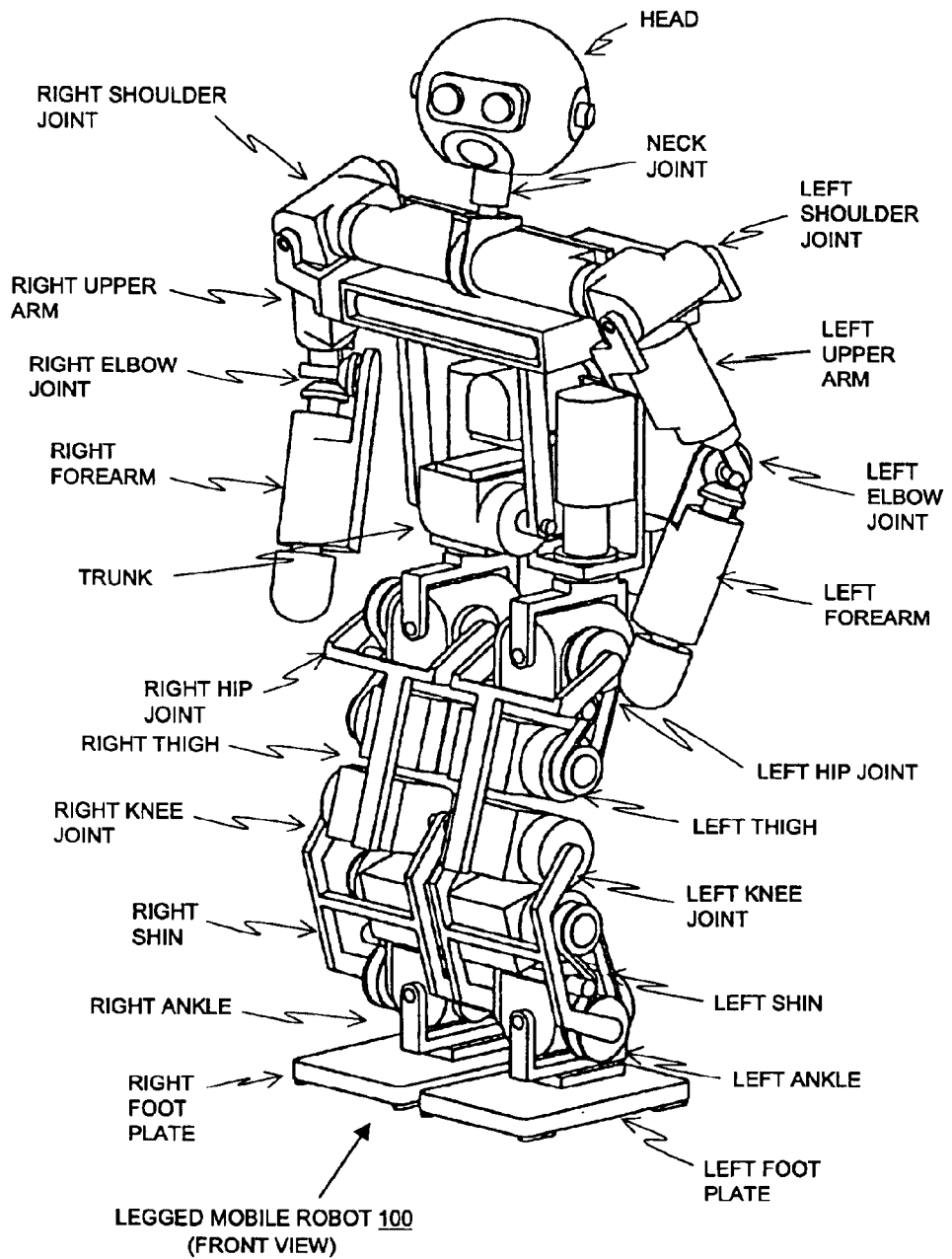
FIG. 1 is an illustration of a legged mobile robot 100 according to an embodiment of the present invention, as viewed from the front.
Figure 2:
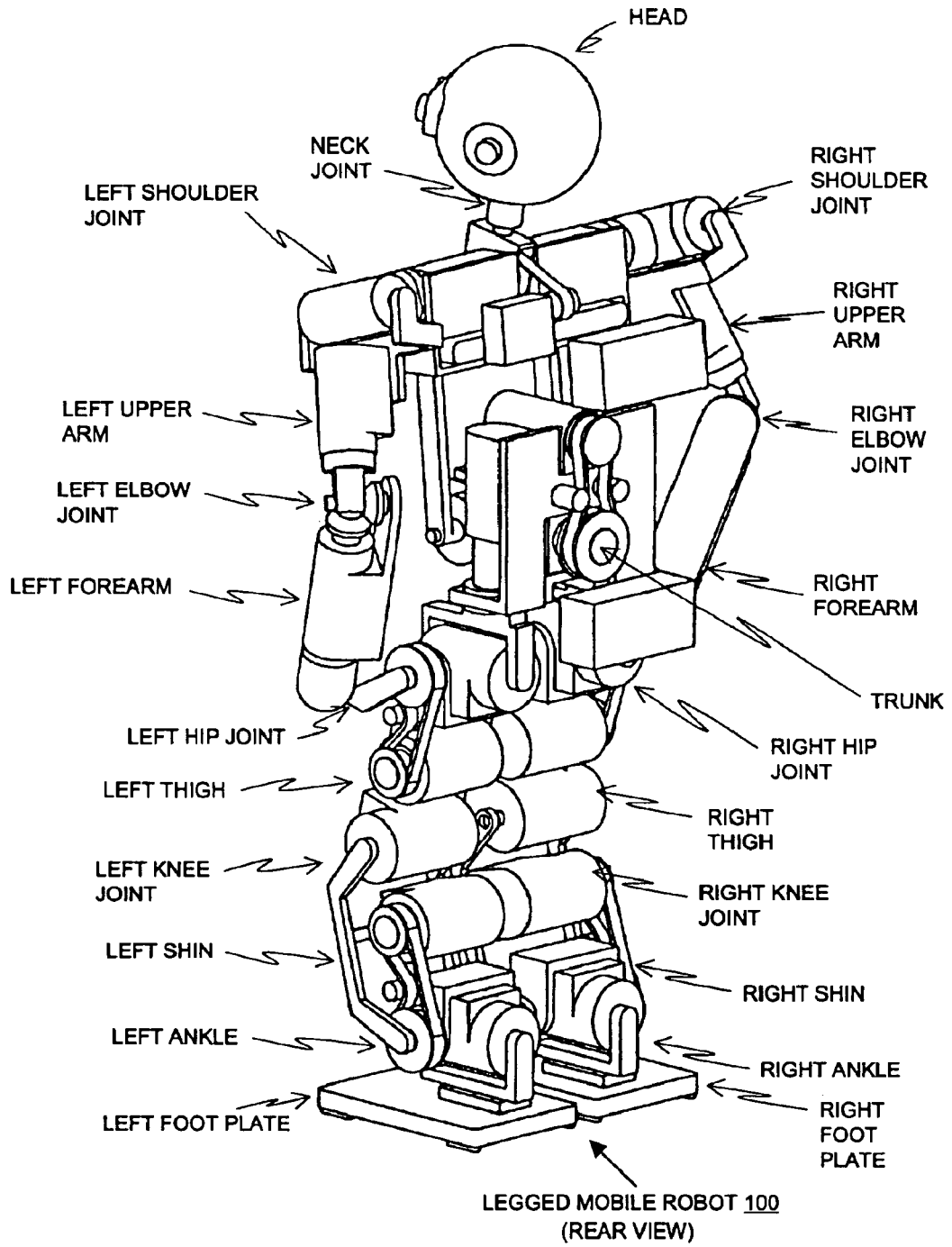
FIG. 2 is an illustration of the legged mobile robot 100 according to the embodiment of the present invention, as viewed from the rear.

FIGS. 1 and 2 show a legged mobile robot 100 according to an embodiment of the present invention, in an upright position, as viewed from front and rear, respectively. The legged mobile robot 100 is of a type called a "humanoid", and as will be described later, it is capable of autonomously controlling its behavior based on results of recognition of external stimuli such as sound and image. As shown in the figures, the legged mobile robot 100 includes two lower limbs, i.e., left and right limbs, that allow movement with legs, a trunk, left and right upper limbs, and a head.

Each of the left and right lower limbs includes a thigh, a knee joint, a shin, an ankle, and a foot plate, and is linked at a substantially lowest end of the trunk by a hip joint. Each of the left and right upper limbs includes an upper arm, an elbow joint, and a forearm, and is linked at a left or right edge of an upper part of the trunk by a shoulder joint. The head is linked to a central part of a substantially top end of the trunk by a neck joint.

The trunk unit includes a control unit not shown in FIGS. 1 and 2. The control unit is a case containing a controller (main control unit) for controlling driving of joint actuators of the legged mobile robot 100 and for processing external inputs from sensors, etc. (described later), a power-supply circuit, and other peripheral devices. The control unit may additionally include a communication interface or a communication apparatus that allows remote operations.

Figure 3:
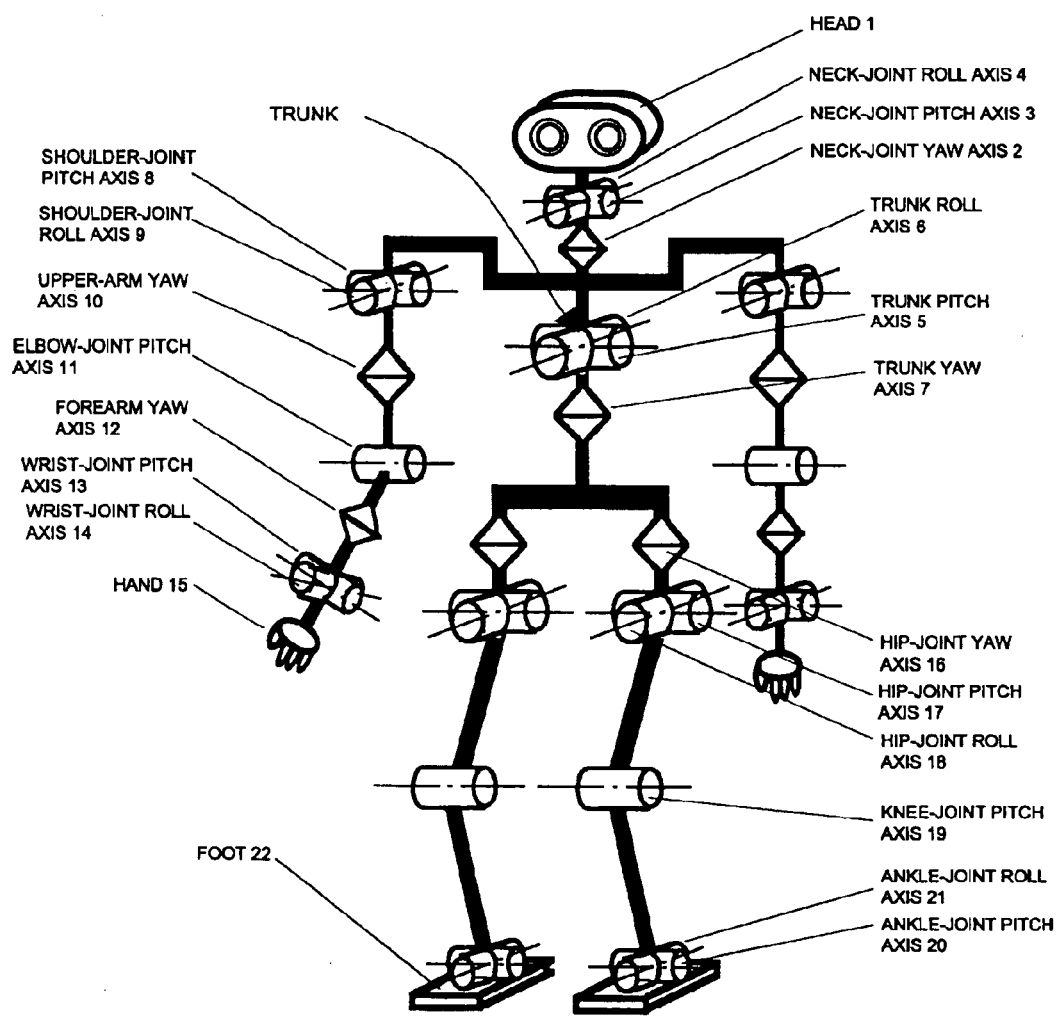
FIG. 3 is an illustration schematically showing a model of degrees of freedom of the legged mobile robot 100 according to the embodiment of the present invention.

FIG. 3 schematically shows the degrees of freedom of joints in the legged mobile robot 100 according to this embodiment. As shown in the figure, the legged mobile robot 100 includes an upper limb including two arms and a head 1, a lower limb including two legs that allow movement, and a trunk linking the upper limb and the lower limb.

A neck joint supporting the head 1 has three degrees of freedom, namely, a neck-joint yaw axis 2, a neck-joint pitch axis 3, and a neck-joint roll axis 4.

Each of the arms has a shoulder-joint pitch axis 8, a shoulder-joint roll axis 9, an upper-arm yaw axis 10, an elbow-joint pitch axis 11, a forearm yaw axis 12, a wrist-joint pitch axis 13, a wrist-joint roll axis 14, and a hand 15. The hand 15 is actually a structure including a plurality of fingers and thus having multiple joints and multiple degrees of freedom. However, since the operation of the hand 15 does not significantly contribute to or affect controlling of attitude stability or controlling of gait of the robot 100, the degrees of freedom thereof are assumed to be zero in this specification. Thus, each of the left and right arms has seven degrees of freedom.

The trunk has three degrees of freedom, namely, a trunk pitch axis 5, a trunk roll axis 6, and a trunk yaw axis 7.

Each of the left and right legs constituting the lower limb has a hip-joint yaw axis 16, a hip-joint pitch axis 17, a hip-joint roll axis 18, a knee-joint pitch axis 19, an ankle-joint pitch axis 20, an ankle-joint roll axis 21, and a foot (foot base or foot plate) 22. Although the foot (foot base) 22 of a human being is actually a structure including a foot base having multiple joints and multiple degrees of freedom, the foot base of the legged mobile robot 100 according to this embodiment has zero degrees of freedom. Thus, each of the legs has six degrees of freedom.

To sum up, the legged mobile robot 100 according to this embodiment as a whole has 3+7×2+3+6×2=32 degrees of freedom in total. The degrees of freedom of the legged mobile robot 100, however, are not necessarily limited to 32. Obviously, the degrees of freedom, i.e., the number of joints, may be increased or decreased as appropriate in accordance with constraints, specification requirements, etc. in design and manufacturing.

The degrees of freedom of the legged mobile robot 100, described above, are actually implemented by active operations of actuators. In consideration of various requirements, such as a requirement for avoiding excessive bulge in the appearance of the apparatus and simulating a natural shape of a human being, and a requirement for controlling the attitude of an unstable structure that walks on two legs, preferably, the joint actuators are small in size and light in weight. In this embodiment, small-sized AC servo actuators, each directly connected to a gear and including a single-chip servo control system incorporated in a motor unit, are used. An AC servo actuator that can be used in the legged mobile robot 100 is disclosed, for example, in Japanese Unexamined Patent Application Publication No. 2000-299970 (specification of Japanese Patent Application No. 11-33386) already assigned to the applicant of this application.

B. Configuration of Behavior Control System of the Robot

Figure 4:
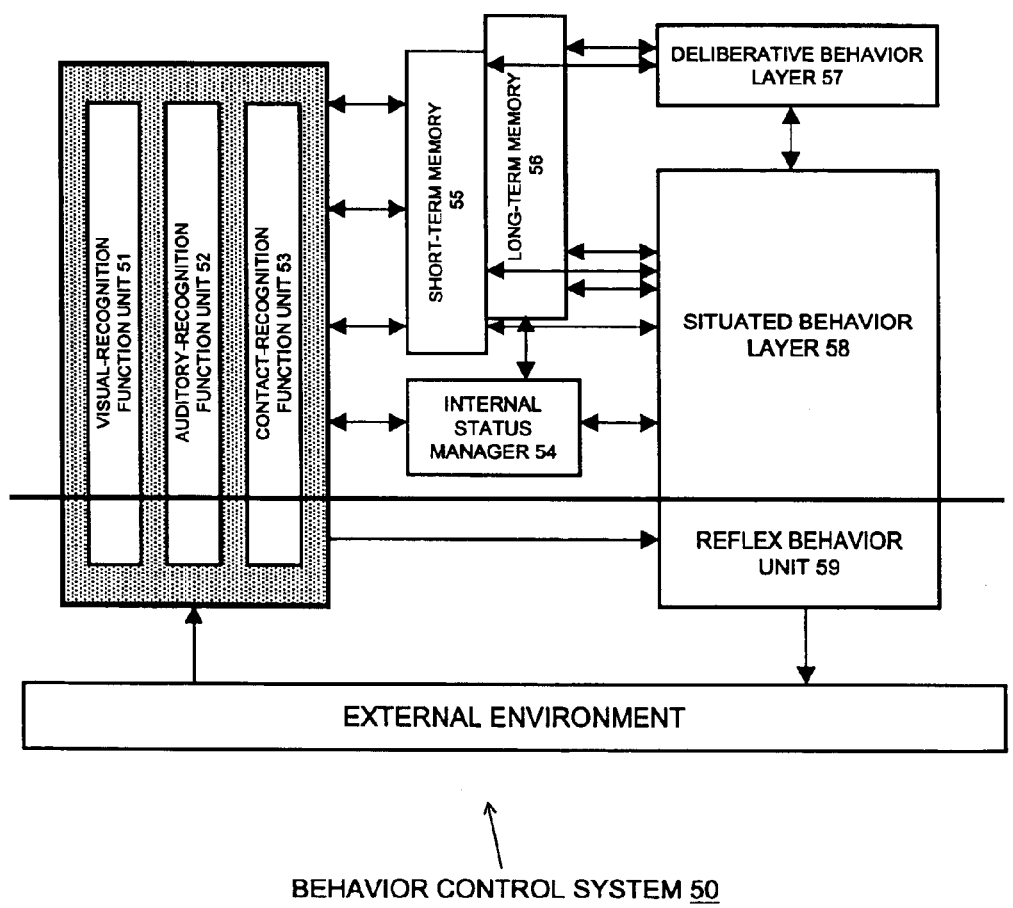
FIG. 4 is a diagram schematically showing the architecture of a behavior control system 50 used in the legged mobile robot 100 according to the embodiment of the present invention.

The legged mobile robot 100 according to this embodiment is allowed to control its behavior in accordance with results of recognition of external stimuli and change in internal status. FIG. 4 schematically shows the basic architecture of a behavior control system 50 that is used in the legged mobile robot 100 according to this embodiment.

The behavior control system 50 shown in the figure can be implemented by object-oriented programming. In that case, each software is handled by units of module referred to as an "object" in which data and processing procedure for the data are integrated. Each object is allowed to pass data and to carry out invocation by inter-object communication by message communication and using a shared memory.

The behavior control system 50 includes a visual-recognition function unit 51, an auditory-recognition function unit 52, and a contact-recognition function unit 53 for allowing recognition of external environment (Environments).

The visual-recognition function unit (Video) 51, based on a captured image input via an image input device such as a CCD (Charge Coupled Device) camera, executes image recognition such as face recognition and color recognition, and extracts a feature. The visual-recognition function unit 51 includes a plurality of objects such as "MultiColorTracker", "FaceDetector", and "FaceIdentify", which will be described later.

The auditory-recognition function unit (Audio) 52 recognizes speech data input via an audio input device such as a microphone, and extracts a feature or recognizes a word set (text). The auditory-recognition function unit 52 includes a plurality of objects such as "AudioRecog" and "AuthurDecoder", which will be described later.

The contact-recognition function unit (Tactile) recognizes a sensor signal of a contact sensor incorporated, for example, in the head of the apparatus body, and thereby recognizes an external stimulus such as "stroked" or "struck".

An internal status manager (ISM) 54 has an instinct model and an emotion model, and it manages internal status such as instinct and emotion of the robot 100 in accordance with external stimuli (ES: ExternalStimula) recognized by the visual-recognition function unit 51, the auditory-recognition function unit 52, and the contact-recognition function unit 53 described above.

The emotion model and the instinct model respectively have recognition results and behavior histories as inputs, and manage emotion values and instinct values. The behavior model is allowed to refer to the emotion values and instinct values.

A short-term memory (ShortTermMemory) 55 is a functional module that holds for a short period a target or event recognized in external environment by the visual-recognition function unit 51, the auditory-recognition function unit 52, and the contact-recognition function unit 53 described above. For example, the short-term memory 55 holds an image input from a camera for a short period on the order of 15 seconds.

A long-term memory (LongTermMemory) 56 is used to hold information obtained by learning, such as a name of an item, for a long period. For example, the long-term memory 56 associatively stores change in internal status of a behavior module based on external stimuli. However, since associative storage in the long-term memory 56 is not directly relevant to the gist of the present invention, description thereof will be omitted herein.

The behavior control of the legged mobile robot 100 according to this embodiment is broadly classified into "reflex behavior" implemented by a reflex behavior unit 59, "situated behavior" implemented by a situated behavior layer 58, and "deliberative behavior" implemented by a deliberate behavior layer 57.

The deliberative behavior layer (DeliberativeLayer) 57 execute planning of behavior of the legged mobile robot 100 over a relatively long period based on content stored in the long-term memory 56.

Deliberative behavior is executed based on inference and on a plan for allowing inference in accordance with a given situation or an instruction issued by a person. Since the inference and planning could require larger processing time and operation load compared with a response time for maintaining interaction by the robot 100, deliberative behavior executes inference and planning while reflex behavior and situated behavior are responding in real time.

The situated behavior layer (SituatedBehaviorsLayer) 58 controls behavior in accordance with current status of the legged mobile robot 100, based on content stored in the short-term memory 55 and the long-term memory 56 and internal status managed by the internal status manager 54.

The situated behavior layer 58 has a state machine for each behavior, and it classifies a result of recognition of external information input to a sensor, depending on previous behavior and situation, so that the apparatus body will express a behavior. Furthermore, the situated behavior layer 58 executes behavior for maintaining internal status within a certain range (also referred to as homeostasis behavior). When internal status goes outside of the specified range, the situated behavior layer 58 activates behavior for returning the internal status within the range so that the behavior will be more likely taken. (Actually, behavior is selected with consideration of both internal status and external environment). Situated behavior is slow to respond compared with reflex behavior (described later).

The deliberative behavior layer 57 and the situated behavior layer 58 may be implemented as applications.

The reflex behavior unit (ConfigurationDependentActionsAndReactions) 59 is a functional module that implements reflex operation of the apparatus body in response to external stimuli recognized by the visual-recognition function unit 51, the auditory-recognition function unit 52, and the contact-recognition function unit 53 described above.

Basically, reflex behavior directly receives a result of recognition of external information input to a sensor, classifies the recognition result, and directly determines an output behavior. For example, behaviors such as tracking a face of a person and nodding are preferably implemented as reflex behaviors.

In the legged mobile robot 100 according to this embodiment, the short-term memory 55 integrates a plurality of results of recognition by the visual-recognition function unit 51, the auditory-recognition function unit 52, the contact-recognition function unit 53, etc. so as to maintain temporal and spatial integrity, and provides perception regarding each item under external environment to a behavior control module such as the situated behavior layer (SBL) 58 as a short-term memory.

Thus, the behavior control module, implemented as an upper module, integrates the plurality of recognition results from external environment and handles it as meaningful symbol information, thereby allowing sophisticated behavior control. Furthermore, using more complex recognition results, such as association with previously observed recognition results, it is possible to determine which flesh-colored region is a face and which person it corresponds to, which person uttered this voice.

Furthermore, since the short-term memory 55 holds information regarding recognized observation results as a memory, even if observation results are temporarily missing during autonomous behavior, it appears to an upper module such as an application that controls behavior of the apparatus body that items are constantly there in perception. For example, information regarding outside of the vision of a sensor is held instead of forgetting it immediately, so that an item that the robot has once lost sight of can be detected again later. Accordingly, a stable system that is less susceptible to recognizer errors and sensor noise and that is not dependent on timing of notifications by recognizers is implemented. Furthermore, since information that is missing from the viewpoint of a single recognizer alone can sometimes be compensated for by other recognition results, recognition performance of the system as a whole is improved.

Furthermore, since related recognition results are associated with each other, an upper module such as an application is allowed to determine its behavior using related information. For example, the robot apparatus is allowed to retrieve a name of a person that has called the robot apparatus. Thus, it is possible to react to a greeting by saying, for example, "Hello, XXX."

Figure 5:
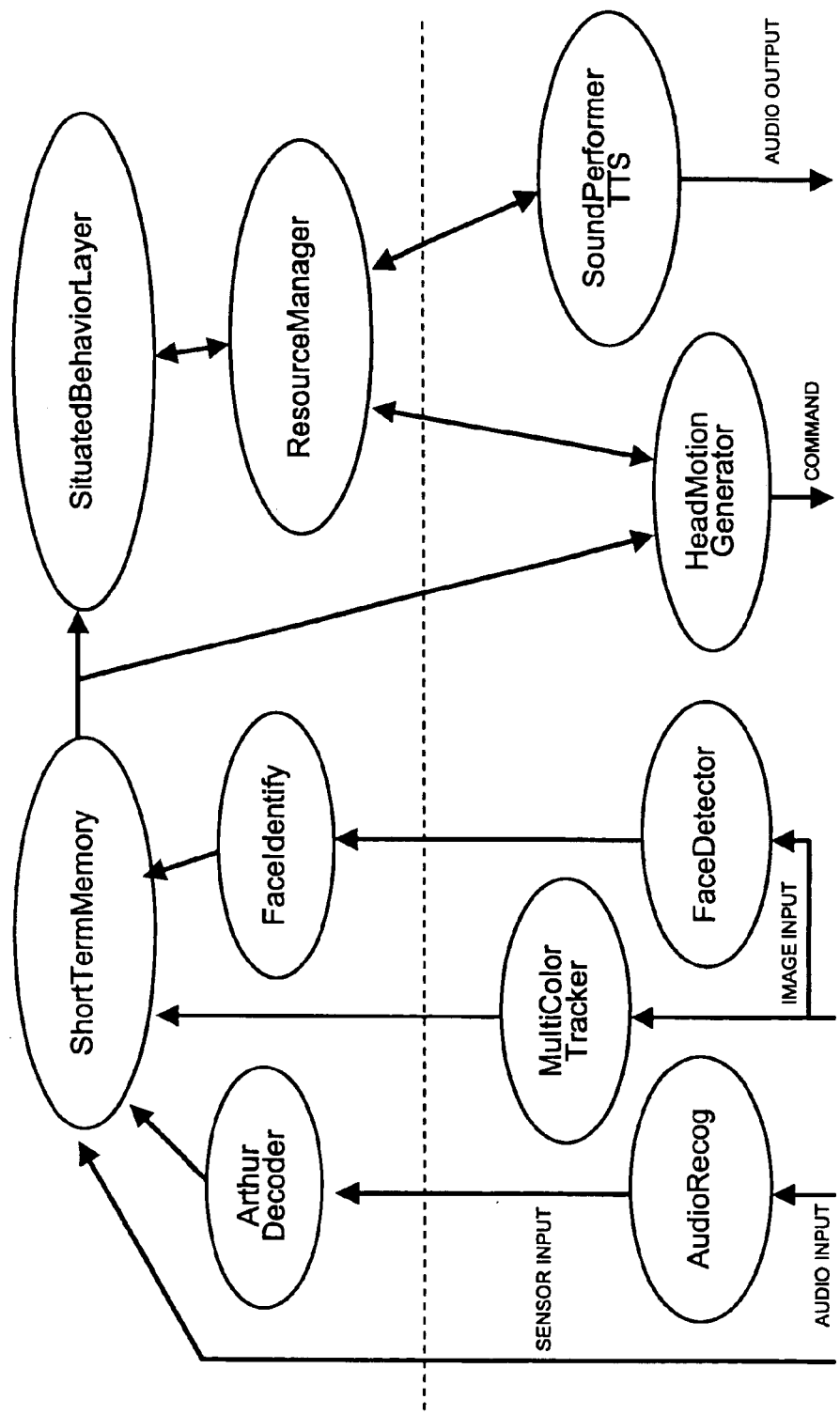
FIG. 5 is a diagram schematically showing a flow of operation of the behavior control system 50.

FIG. 5 shows a flow of operation of the objects constituting the behavior control system 50 shown in FIG. 4.

In the figure, a circle represents an entity called an "object" or "process". The overall system operates by asynchronous communications among the objects. Each of the objects exchanges data and carries out invocation by inter-object communication by message communication and using a shared memory.

AudioRecog:

This is an object that receives speech data from an audio input device such as a microphone and that extracts a feature and detects a speech segment. Furthermore, if the microphone is of stereo type, the horizontal direction of a sound source can be estimated. If a speech segment is detected, a feature of speech data of that segment and the direction of the sound source are fed to ArtherDecoder (described later).

ArthurDecoder:

This is an object that recognizes speech using the speech feature received from AudioRecog and a speech dictionary and a syntax dictionary. A set of recognized words is transferred to the short-term memory (ShortTermMemory) 55.

MultiColorTracker:

This is an object that recognizes color. MultiColorTracker receives image data from an image input device such as a camera, extracts color regions based on a plurality of color models prepared in advance to form continuous divided regions. Information regarding the position, size, and feature of each of the divided regions is output and transferred to the short-term memory (ShortTermMemory) 55.

FaceDetector:

This is an object that detects a face region from an image frame. FaceDetector receives image data from an image input device such as a camera, and reduces the image data into images of nine scales. A rectangular region corresponding to a face is searched for from all of the images. Information regarding the position, size, and feature of a region finally determined as a face by reducing overlapping candidate regions is output and transferred to FaceIdentify (described later).

FaceIdentify:

This is an object that discriminates a face image detected. FaceIdentify receives an image of a rectangular image region corresponding to a face region from FaceDetector, and identifies a person by determining which person in a person dictionary at hand corresponds to the face image. At that time, FaceIdentify receives a face image from face detection, and outputs the position and size information of the face image region and ID information of the person.

ShortTermMemory (Short-Term Memory):

This is an object that holds information regarding external environment of the robot 100 for a relatively short period. ShortTermMemory receives a result of speech recognition (words, direction of speech source, and confidence) from ArthurDecoder, the position and size of a flesh-colored region and the size and position of a face region from MultiColorTracker, and ID information or the like of a person from FaceIdentify. Furthermore, ShortTermMemory receives a direction of the neck of the robot (joint angle) from sensors on the apparatus body of the robot 100. Furthermore, by using the recognition results and sensor outputs in an integrated manner, ShortTermMemory stores information as to which person is present in which position, which person uttered words, and what conversation has been carried out by that person. Physical information regarding an item, i.e., a target, and events in time order (history) are output and transferred to an upper module such as the situated behavior layer (SBL).

SituatedBehaviorLayer (Situated Behavior Layer):

This is an object that determines behavior of the robot 100 (situated behavior) based on information from ShortTermMemory (short-term memory) described above. SituatedBehaviorLayer allows simultaneous evaluation and execution of a plurality of behaviors. Furthermore, SituatedBehaviorLayer allows switching of behaviors to let the apparatus body enter sleep mode and activate another behavior.

ResourceManager:

This is an object that executes arbitration of hardware resources of the robot 100 in response to output commands. In the example shown in FIG. 5, resource arbitration between an object that controls a speaker for audio output and an object for controlling motion of the neck is executed.

SoundPerformerTTS:

This is an object for audio output. SoundPerformerTTS carries out speech synthesis in response to a text command input from SituatedBehaviorLayer via ResourceManager, and outputs a speech from a speaker on the apparatus body of the robot 100.

HeadMotionGenerator:

This is an object that calculates a joint angle of the neck in response to a command for moving the neck, received from SituatedBehaviorLayer via ResourceManager. When a "tracking" command is received, HeadMotionGenerator calculates and outputs a joint angle with which the neck will be directed to the position of an item based on position information of the item received from ShortTermMemory.

C. Short-Term Memory

In the legged mobile robot 100 according to this embodiment, ShortTermMemory (short-term memory) 55 integrates results of recognition regarding external stimuli by a plurality of recognizers so as to maintain temporal and spatial integrity, and handles the integrated information as meaningful symbol information. Thus, an upper module such as the situated behavior layer (SBL) 58 is allowed to determine which flesh-colored region is a face and which person it corresponds to, or which person uttered this voice by using more complex recognition results such as association with previously observed recognition results.

The short-term memory unit 55 includes memory objects of two types, namely, a target memory and an event memory.

The target memory integrates information from the recognition function units 51 to 53, and holds targets, i.e., information regarding items that are currently in perception. Thus, in accordance with appearance and disappearance of target items, relevant targets are deleted from a storage region (GarbageCollector) and newly generated. Furthermore, a single target can be expressed by a plurality of recognition attributes (TargetAssociate), for example, a target that is flesh-colored, that is a face pattern, and that utters voice (human face).

The position and attitude information of an item that is held in the target memory (target) is represented using a world coordinate system in which a particular part of the apparatus body, such as the trunk of the robot 100, is fixed at a predetermined position, instead of sensor coordinate systems used in the recognition function units 51 to 53. Thus, the short-term memory (STM) 55 constantly monitors the current value (sensor output) of each of the joints of the robot 100, and executes conversion from the sensor coordinate system into the fixed coordinate system. This allows integration of information from the recognition function units 51 to 53. For example, even when the robot 100 moves the neck and the attitude of a sensor changes, the position of the item as viewed from a behavior control module such as the situated behavior layer (SBL) remains the same, so that handling of the target is facilitated.

The event memory is an object that stores events that has occurred under external environment from the past to the present sequentially in time order. Events that are handled in the event memory include information regarding change in external environment, such as appearance and disappearance of targets, recognized words of speech, and change in own behavior or attitude.

An event includes change in the status of a target. Thus, an ID of the relevant target is included in event information so that more detailed information regarding the event occurred can be retrieved from the target memory described above.

A feature of the present invention is that a target is detected by integrating information of two or more types of sensors having different attributes. The distance between a sensor result and a stored result is calculated, for example, by a normal distance calculation (polar coordinate in angle) that uses a result of subtracting one half of the magnitudes of the sensor results and the stored result from the distance of a center position of the target.

When sensor information regarding a voice and sensor information regarding a face are integrated, if a recognition result regarding a face (face) is included in a target in the short-term memory unit when a recognition result regarding a voice (voice) is obtained, integration is carried out based on normal distance calculation. Otherwise, the distance is assumed to be infinite.

When sensor information regarding color is integrated, if a result of recognition of color (color) is the same as a color of the target that is stored, a distance of (normal distance)× 0.8 is assumed, and otherwise a distance of (normal distance)×4.0 is assumed.

When a sensor result and a stored result are integrated, a rule that the average of elevation angle and horizontal angle is within 25 degrees in the case of polar coordinate representation, or a rule that normal distance is within 50 cm in the case of Cartesian coordinate system, is applied for normal integration.

Differences among individual recognition results can be handled by applying weights in calculation of the distance between recognition results and targets.

Figure 6:
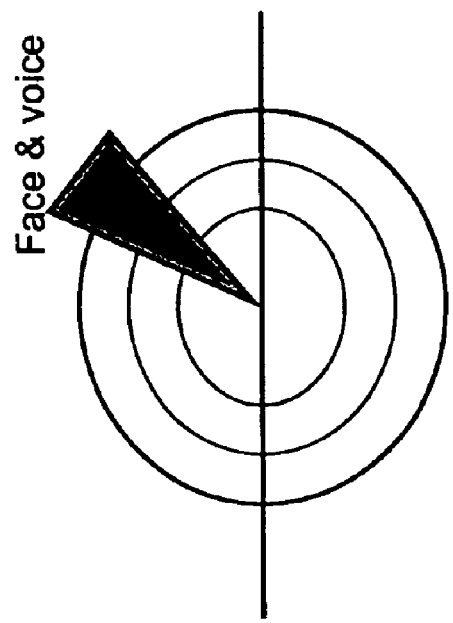
FIG. 6 is a diagram schematically showing operation of a short-term memory 55.
Figure 6:
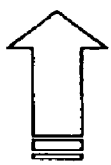
Figure 6:
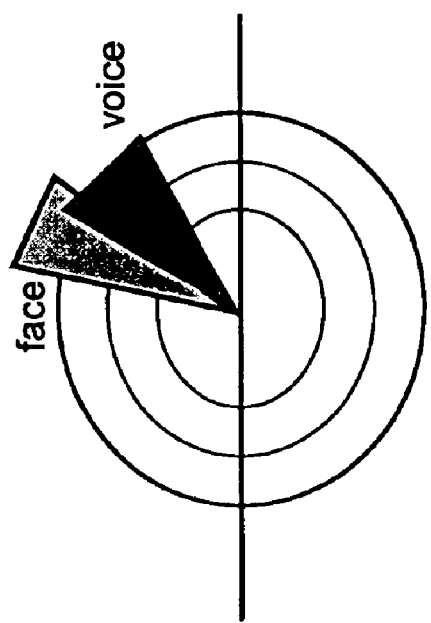

FIG. 6 schematically shows operation of the short-term memory 55. The figure shows an example operation in which a result of face recognition (FACE) and results of speech recognition and recognition of speech source direction (VOICE) are processed at different timings and the short-term memory 55 is notified thereof. (The representation is in polar coordinate system with the origin at the apparatus body of the robot 100.) In this case, since the results of recognition are temporally and spatially close (overlapped) with each other, it is determined as a single item with attributes of face and speech, and the target memory is updated accordingly.

Figure 7:
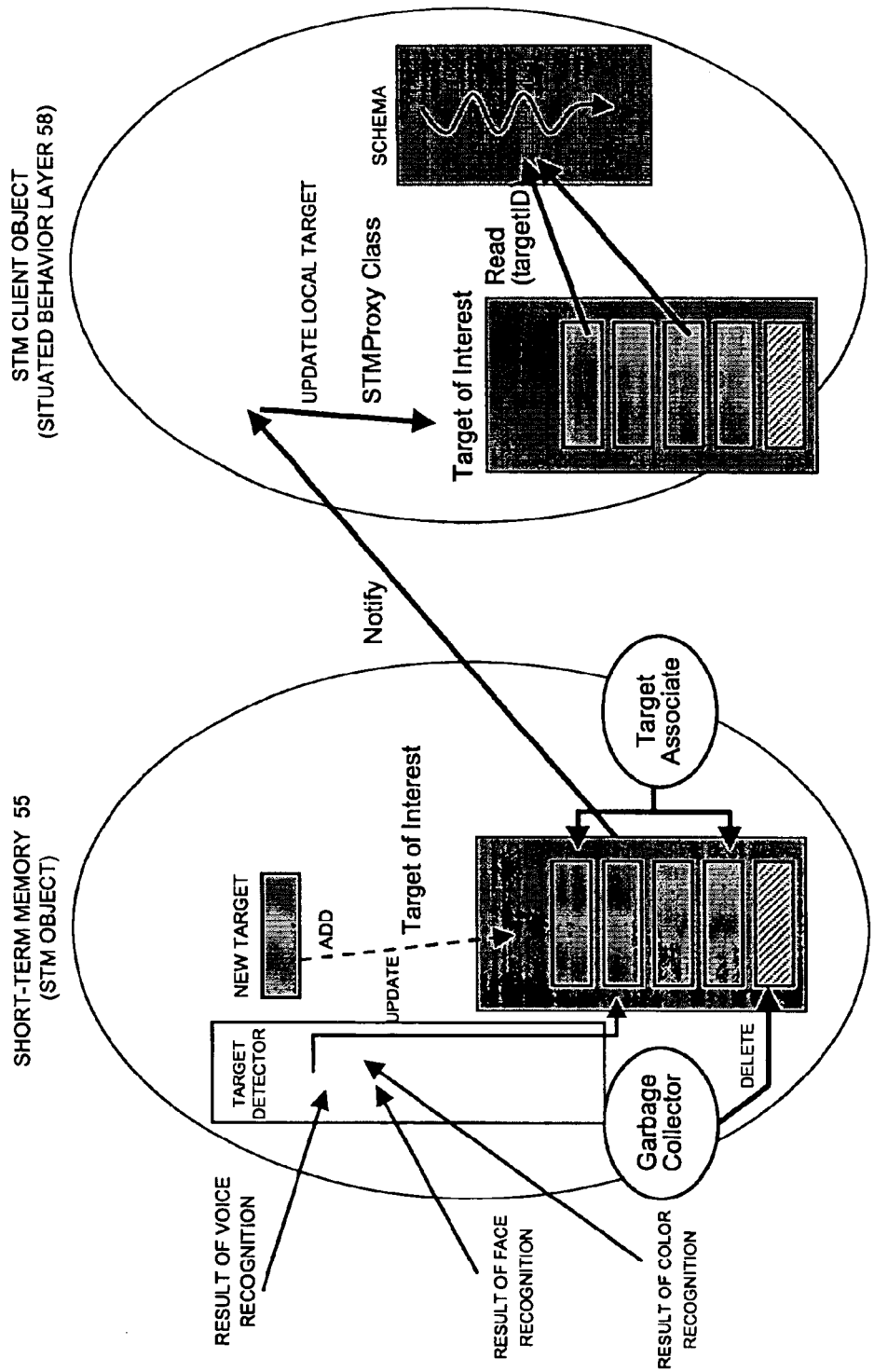
FIG. 7 is a diagram showing a flow of information that enters a target memory based on results of recognition by recognition function units 51 to 53.
Figure 8:
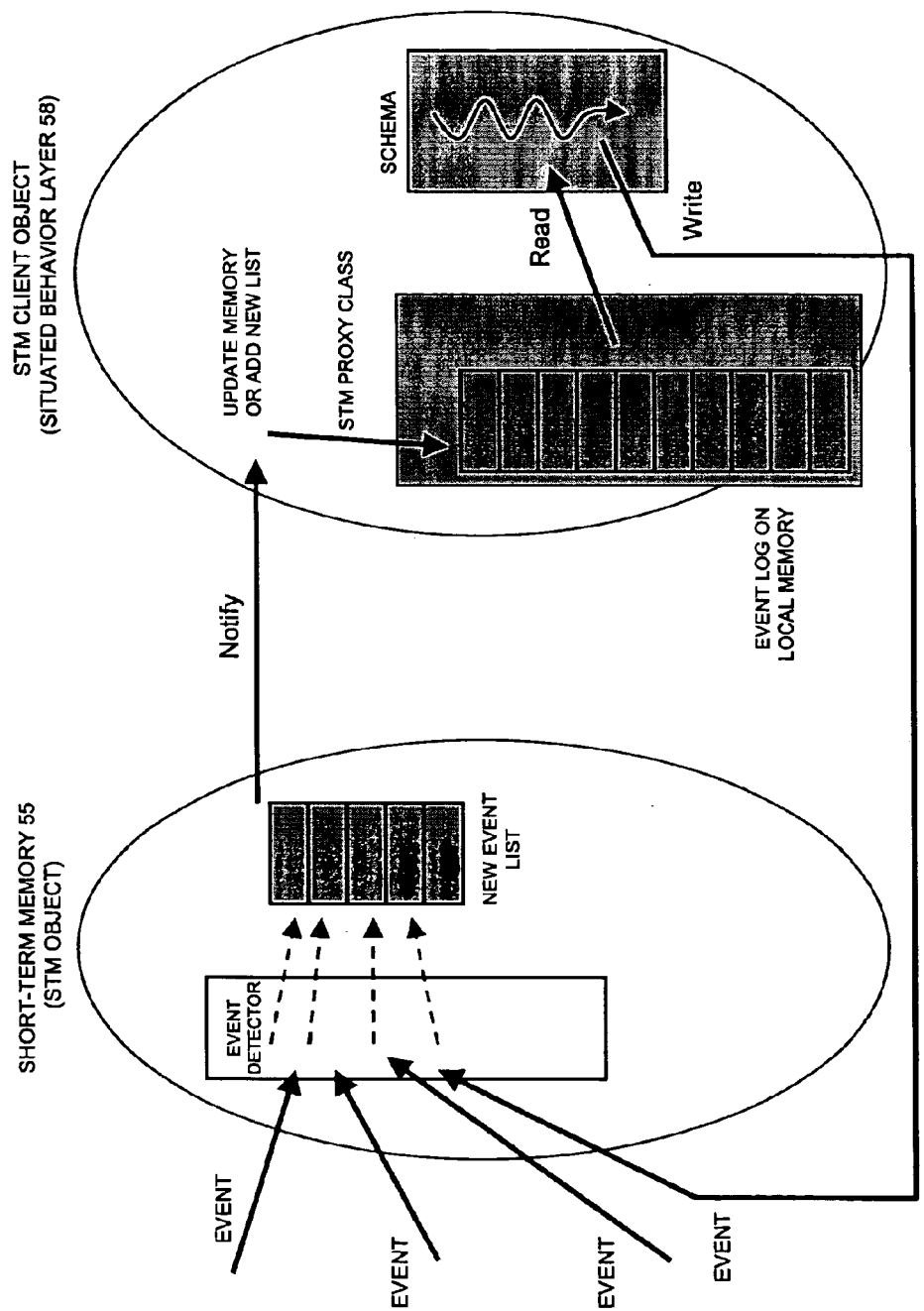
FIG. 8 is a diagram showing a flow of information that enters an event memory based on results of recognition by the recognition function units 51 to 53.

FIGS. 7 and 8 show flows of information that enter the target memory and the event memory in the short-term memory 55, respectively, based on results of recognition by the recognition function units 51 to 53.

Referring to FIG. 7, in the short-term memory 55 (STM object), a target detector for detecting a target from the external environment is provided. The target detector, based on results of recognition by the recognition function units 51 to 53, such as results of voice recognition, face recognition, and color recognition, adds a new target or updates an existing target so as to reflect the recognition results. The target detected is held in the target memory.

Furthermore, the target memory has functions including garbage collector (GarbageCollector) for finding targets no longer observed and deleting the targets, and target association (TargetAssociate) for determining relevance among a plurality of targets and associating with the same target. The garbage collector is implemented such that confidence of targets is decremented as time passes and that targets whose confidence has fallen below a predetermined value is deleted. Furthermore, target association allows identification of the same target on the basis of spatial and temporal closeness between targets having similar features of the same attribute (recognition type).

The situated behavior layer (SBL) is an object that acts as a client of the short-term memory 55. The situated behavior layer periodically receives notifications regarding targets (Notify) from the target memory. In this embodiment, an STM proxy class copies targets in a client-local work area that is independent of the short-term memory 55 (STM object) to constantly hold the latest information. Then, a desired target is read from a local target list (Target of Interest), and a schema, i.e., a behavior module, is determined.

Furthermore, as shown in FIG. 8, an event detector for detecting events that occur in external environment is provided in the short-term memory 55 (STM object). The event detector detects generation of a target by the target detector and deletion of a target by the garbage collector as events. If results of recognition by the recognition function units 51 to 53 relate to speech recognition, the content of the utterance constitutes an event. Events generated are stored in the event memory as an event list, in order of time of generation.

The situated behavior layer (SBL), described earlier, is an object that acts as a client of the short-term memory 55 (STM client), and it constantly receives notifications of events (Notify) from the event memory. In this embodiment, an STM proxy class creates a copy of event list in a client-local work area that is independent of the short-term memory 55 (STM object). Then, a desired event is read from the local event list, and a schema, i.e., a behavior module, is determined. A behavior module that has been executed is detected as a new event by the event detector. Old events are sequentially deleted from the event list, for example, in an FIFO (Fast In Fast Out) manner.

Figure 9:
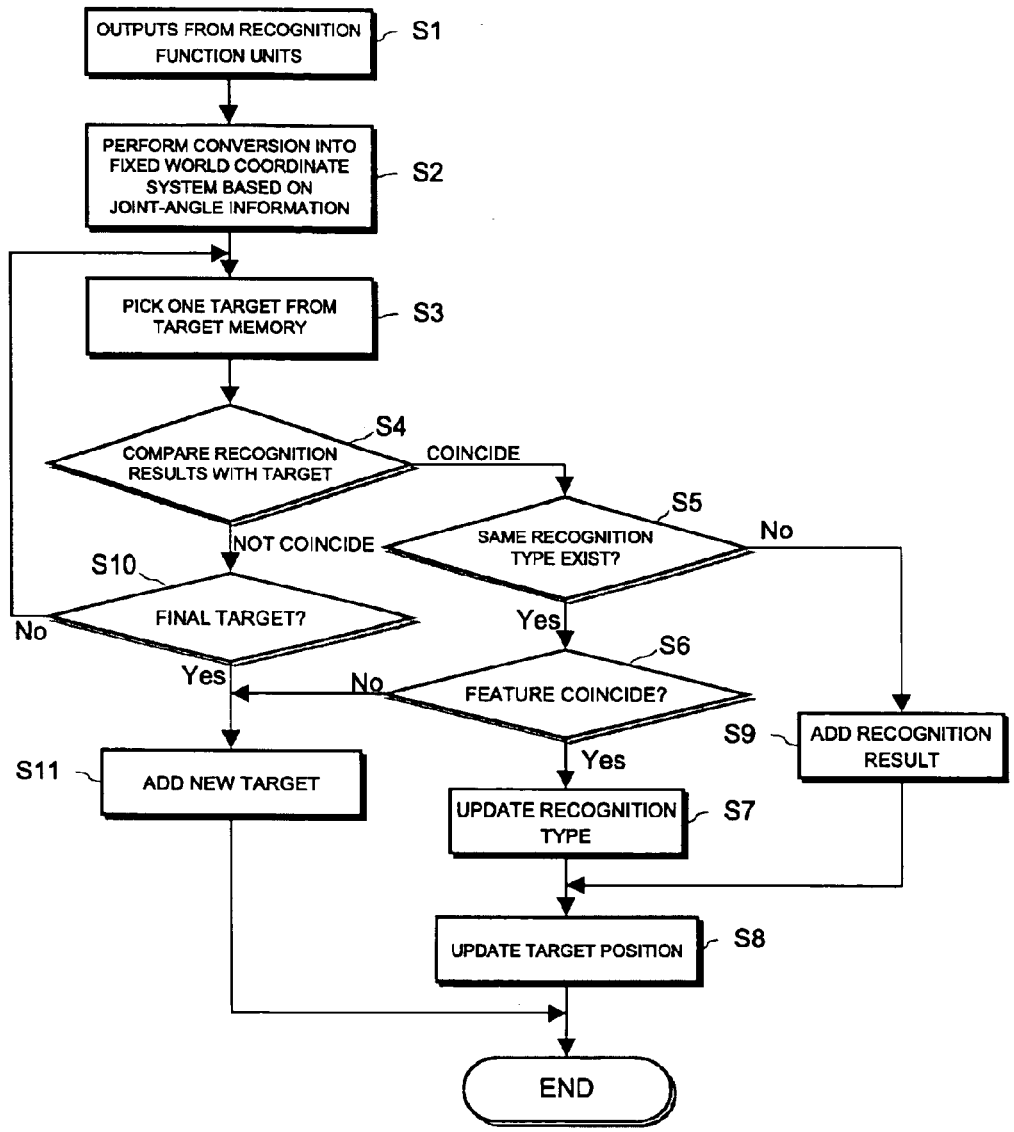
FIG. 9 is a flowchart showing processing operation of a target detector.

FIG. 9 is a flowchart showing processing operation of the target detector. Processing for updating the target memory by the target detector will be described below with reference to the flowchart.

When recognition results are received from the function recognition units (step S1), joint-angle data at the same time as the time of the recognition results is searched for, and the recognition results are converted from the sensor coordinate systems into the world fixed coordinate system based on the joint-angle data (step S2).

Then, a target is picked from the target memory (Target of Interest) (step S3), and position and time information of the target is compared with position and time information of the recognition results (step S4). If the positions are overlapped and measurement times are close to each other, it is determined that the target coincides with the recognition results.

If coincidence is observed, it is further checked whether information of the same recognition type as the recognition results exists in the target (step S5).

If information of the same recognition type exists, it is further checked whether features coincide with each other (step S6). If the features coincide with each other, the current recognition results are reflected (step S7), the target position and observation time of the target are updated (step S8), and the entire processing routine is then exited.

On the other hand, if the features do not coincide, a new target is generated, the current recognition results are assigned thereto (step S11), and the entire processing routine is then exited.

If it is determined in step S5 that information of the same recognition type does not exist in the target having coincident recognition information, recognition results are added for the target (step S9), the target position and observation time are updated (step S9), and the entire processing routine is then exited.

If it is determined in step S4 that the picked target does not coincide with the position and time information of the recognition results, subsequent targets are picked sequentially (step S10), and the processing described above is repeated. If no target coinciding with the recognition results is found, a new target is generated, the current recognition results are assigned thereto (step S11), and the entire processing routine is then exited.

As described earlier, addition or updating of a target by the target detector constitutes an event.

Figure 10:
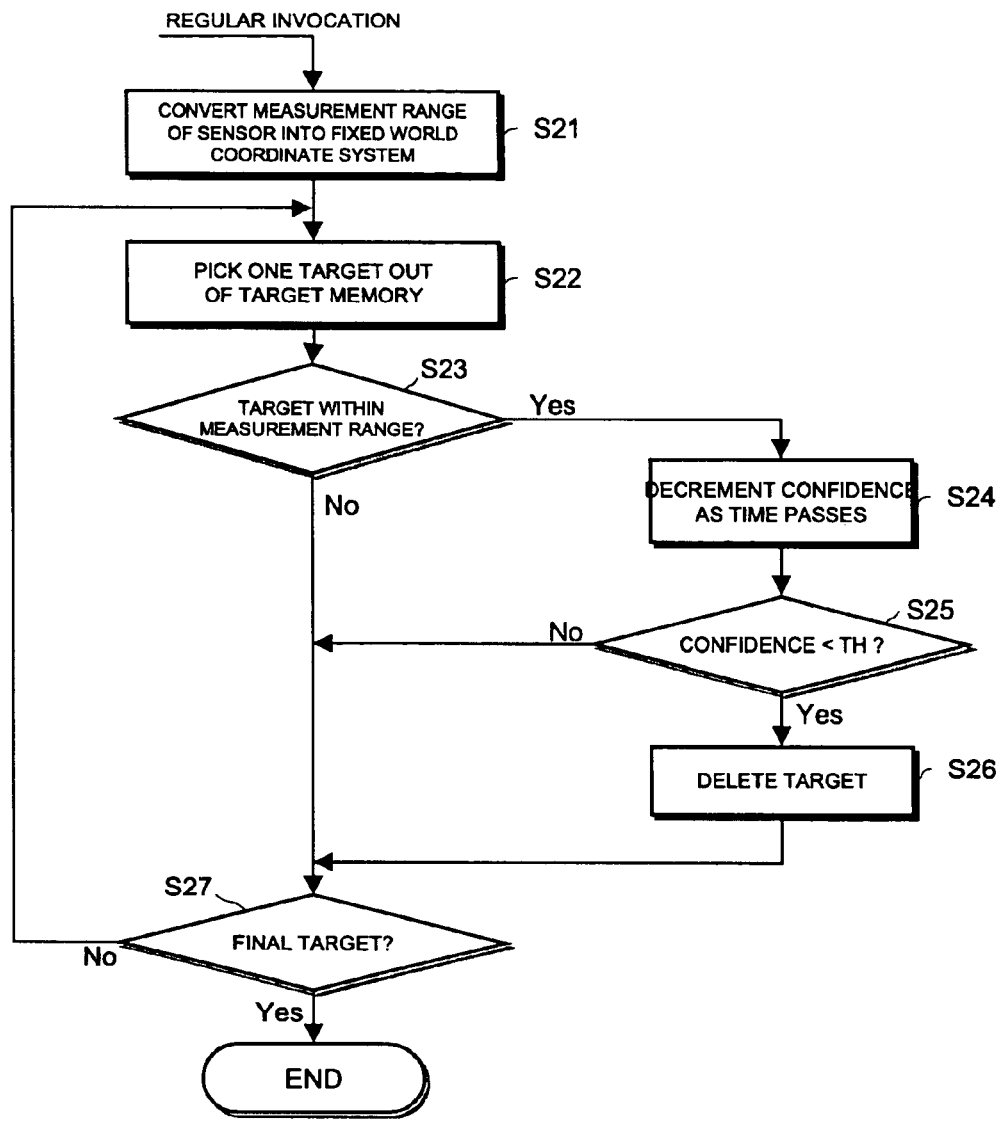
FIG. 10 is a flowchart showing processing procedure for deleting a target from the target memory by a garbage collector.

FIG. 10 shows a flowchart of a processing procedure for deleting a target from the target memory by the garbage collector.

The garbage collector is regularly invoked and activated. First, measurement ranges of sensors are converted into the world fixed coordinate system (step S21).

Then, a target is picked from the target memory (Target of Interest) (step S22). Then, it is checked whether the picked target exists within the measurement ranges of the sensors (step S23).

If the target exits in the measurement ranges of the sensors, the confidence of the target is decremented as time passes (step S24). If there is a possibility that the target does not exist due to failure of updating information of the target even though the target is in the measurement ranges of the sensors, the confidence of the target is also decremented. As for a target not within the measurement ranges, the information is held.

When the confidence of the target falls below a predetermined threshold TH (step S25), it is determined that the target is no longer being observed, and the target is deleted from the target memory (step S26).

The updating of confidence and deletion of target described above is repeated for every target (step S27).

As described earlier, deletion of a target by the garbage collector constitutes an event.

Figure 11:
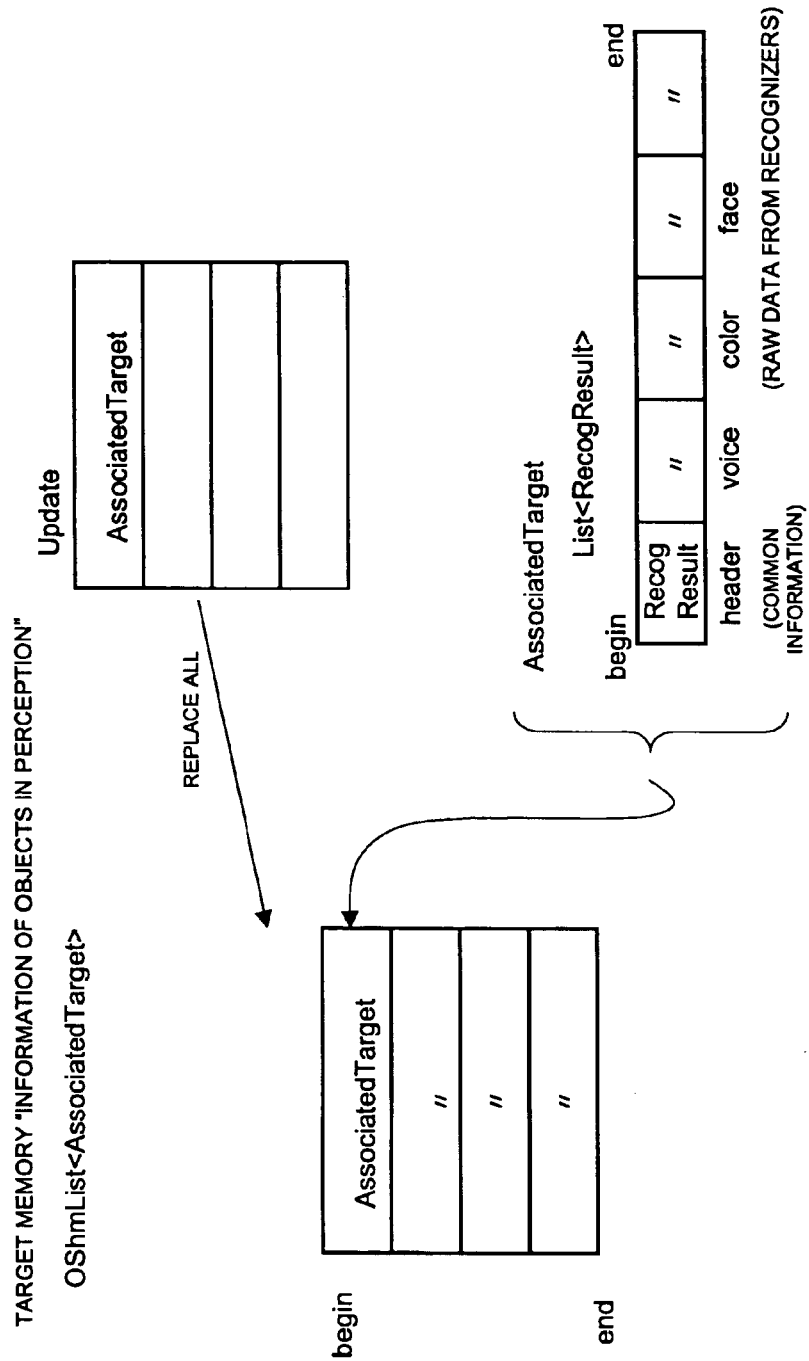
FIG. 11 is a diagram showing data representation of the target memory.

FIG. 11 shows data representation of the target memory. As shown in the figure, a target is a list having a plurality of recognition results called AssociatedTarget as elements thereof. Thus, a target is allowed to have an unlimited number of associated recognition results.

At the beginning of the list, physical information of the target, such as position and size, determined based on all the recognition results in an integrated manner, is stored, followed by recognition results regarding speech (voice), color (color) and face (face). An AssociatedTarget is loaded in a shared memory and generated or deleted in accordance with appearance and disappearance of a target. An upper module is allowed to obtain information regarding items the robot 100 is currently conscious of by referring to the memory.

Figure 12:
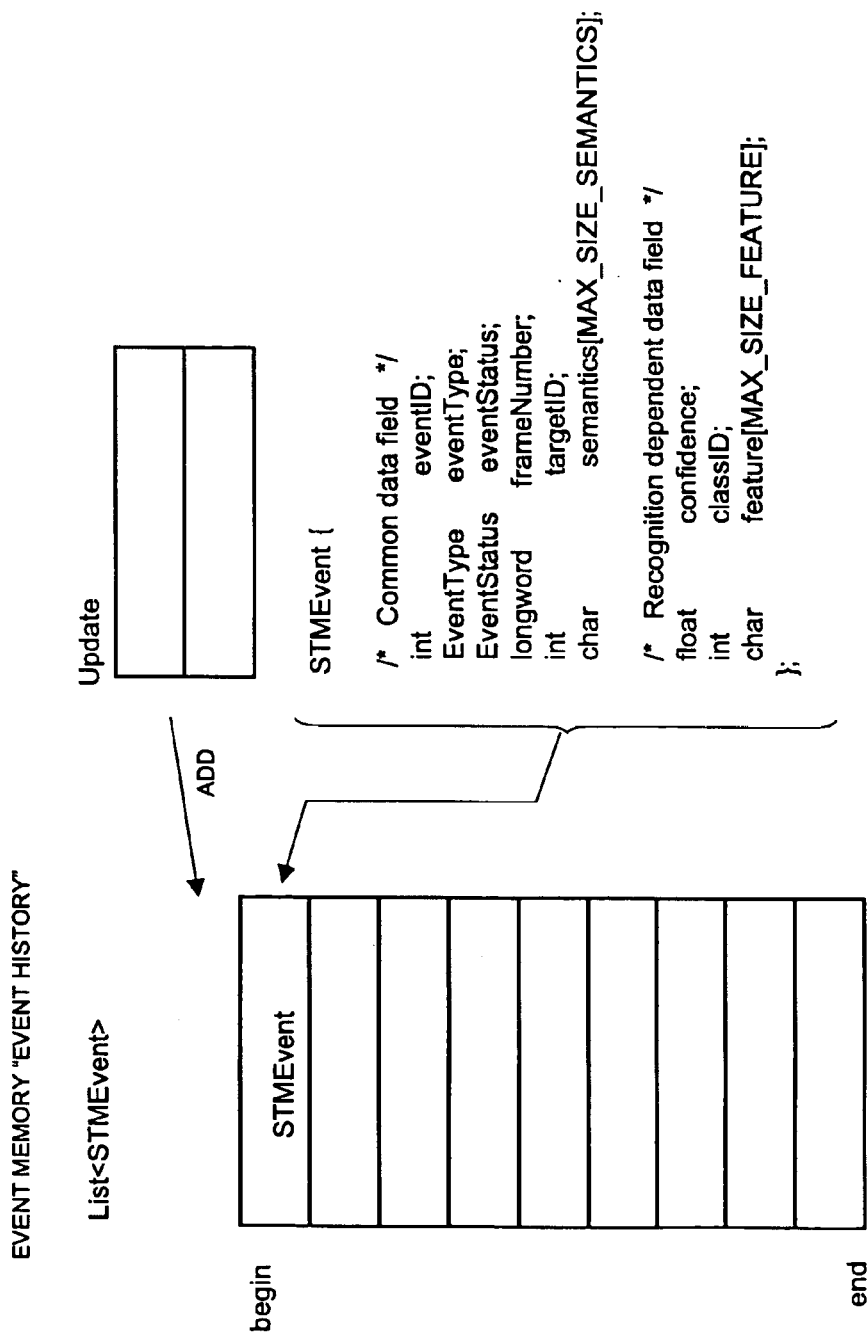
FIG. 12 is a diagram showing data representation of the event memory.

FIG. 12 shows data representation of the event memory. As shown in the figure, each event is expressed as a structure called STMEvent, including a data field common to every event and a field unique to a recognizer that has detected the event.

The event memory is a storage area storing a list of STMEvent structures as elements. An upper module is allowed to find a desired event using relevant data among data in the data fields of the STMEvents. By searching for an event as described above, when history of conversation with a particular person is searched for, all the words that have been uttered by that person can be listed using a target ID associated with the person and an event type of SPEECH (utterance).

Figure 13:
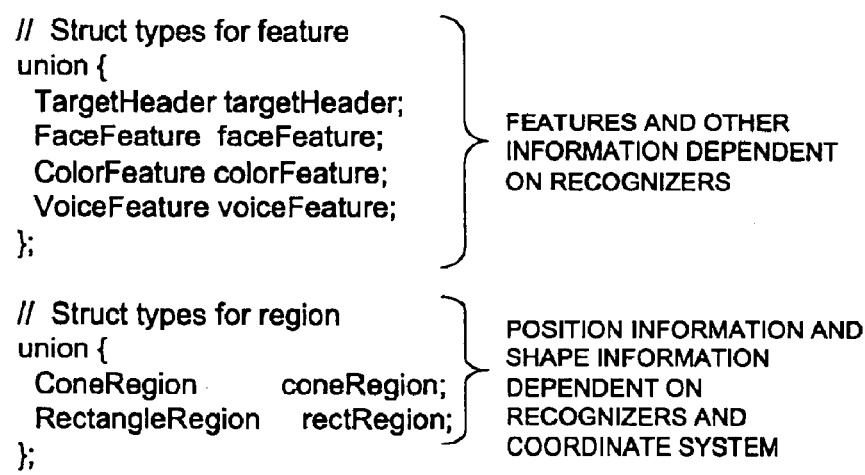
FIG. 13 is an example of a structure for storing results of recognition by the recognition function units 51 to 53.

FIG. 13 shows an example of a structure that stores results of recognition by the recognition function units 51 to 53. The data field of the structure shown in the figure includes a data field for features, etc. that are dependent on the recognition function units 51 to 53 and a physical parameter field that is not dependent on recognition, such as position, size, and velocity.

D. Interaction Process by the Robot

In the legged mobile robot 100 according to this embodiment, results of recognition of external stimuli by a plurality of recognizers are integrated so as to maintain temporal and spatial integrity, and the integrated information is handled as meaningful symbol information. Thus, it is possible to determine which flesh-colored region is a face and corresponds to which person, or which person has uttered this voice, using more complex recognition results such as association with previously observed recognition results.

Figure 14:
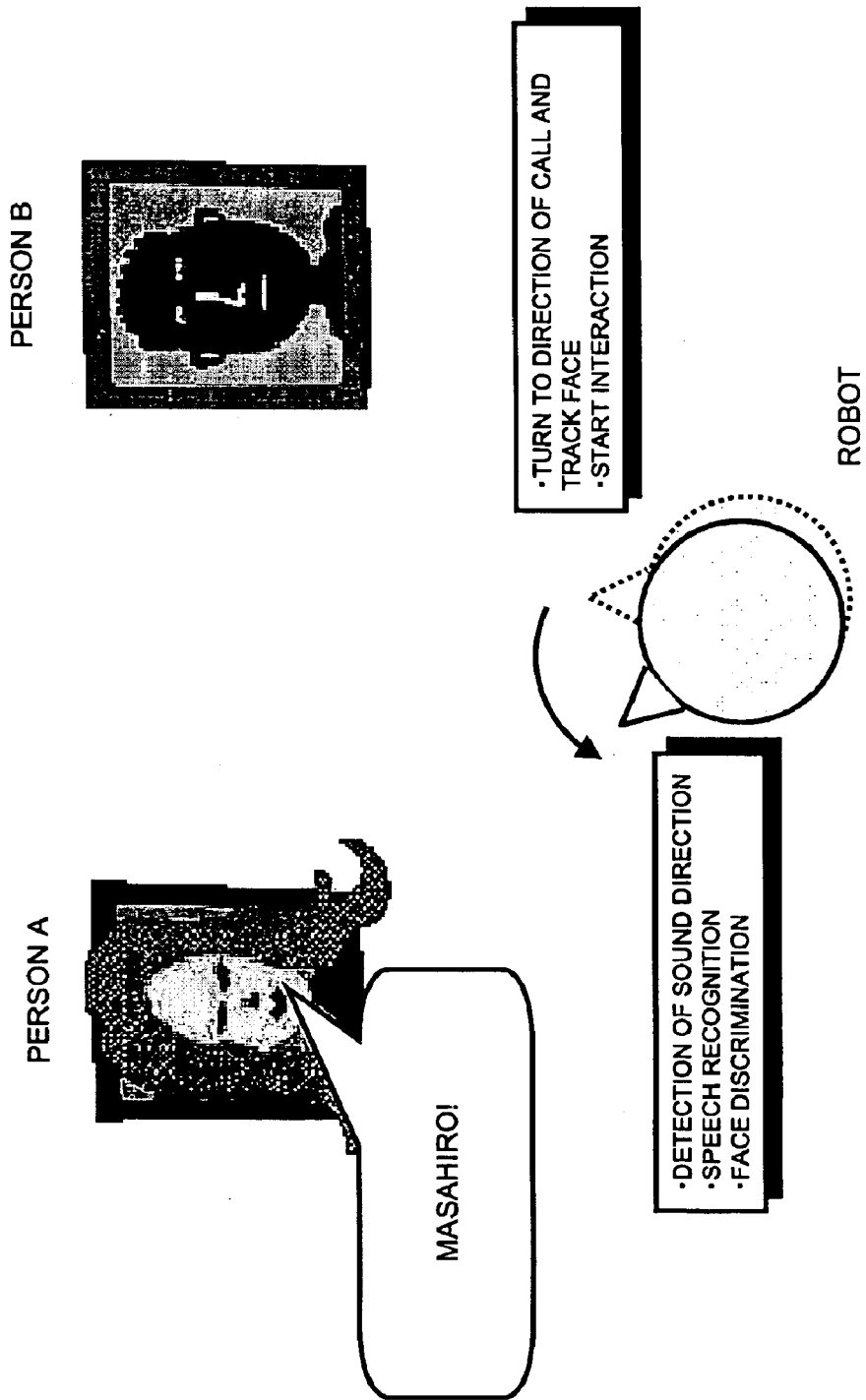
FIG. 14 is a diagram showing an example of interaction processing of the robot 100 with users A and B.
Figure 15:
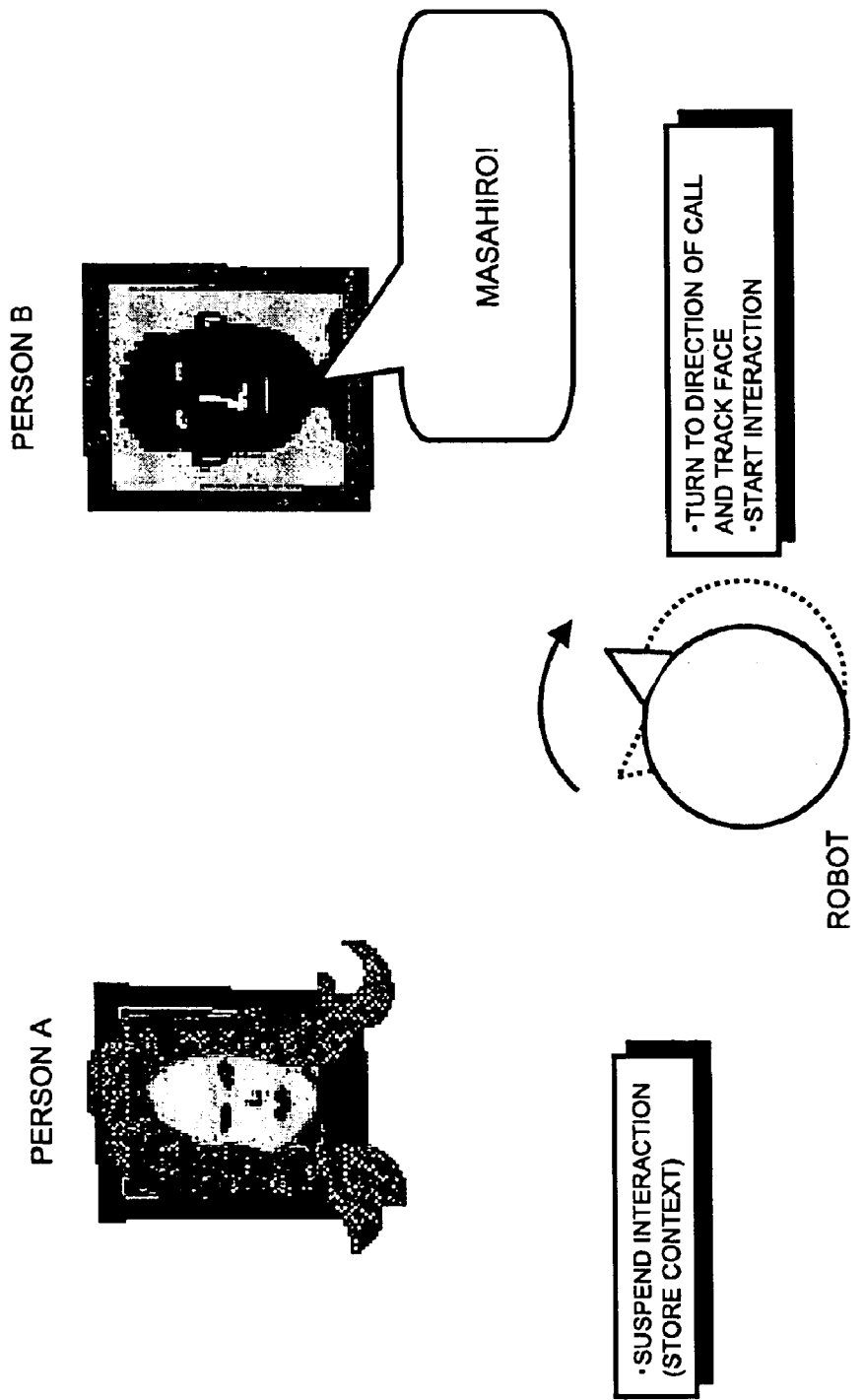
FIG. 15 is a diagram showing an example of interaction processing of the robot 100 with the users A and B.
Figure 16:
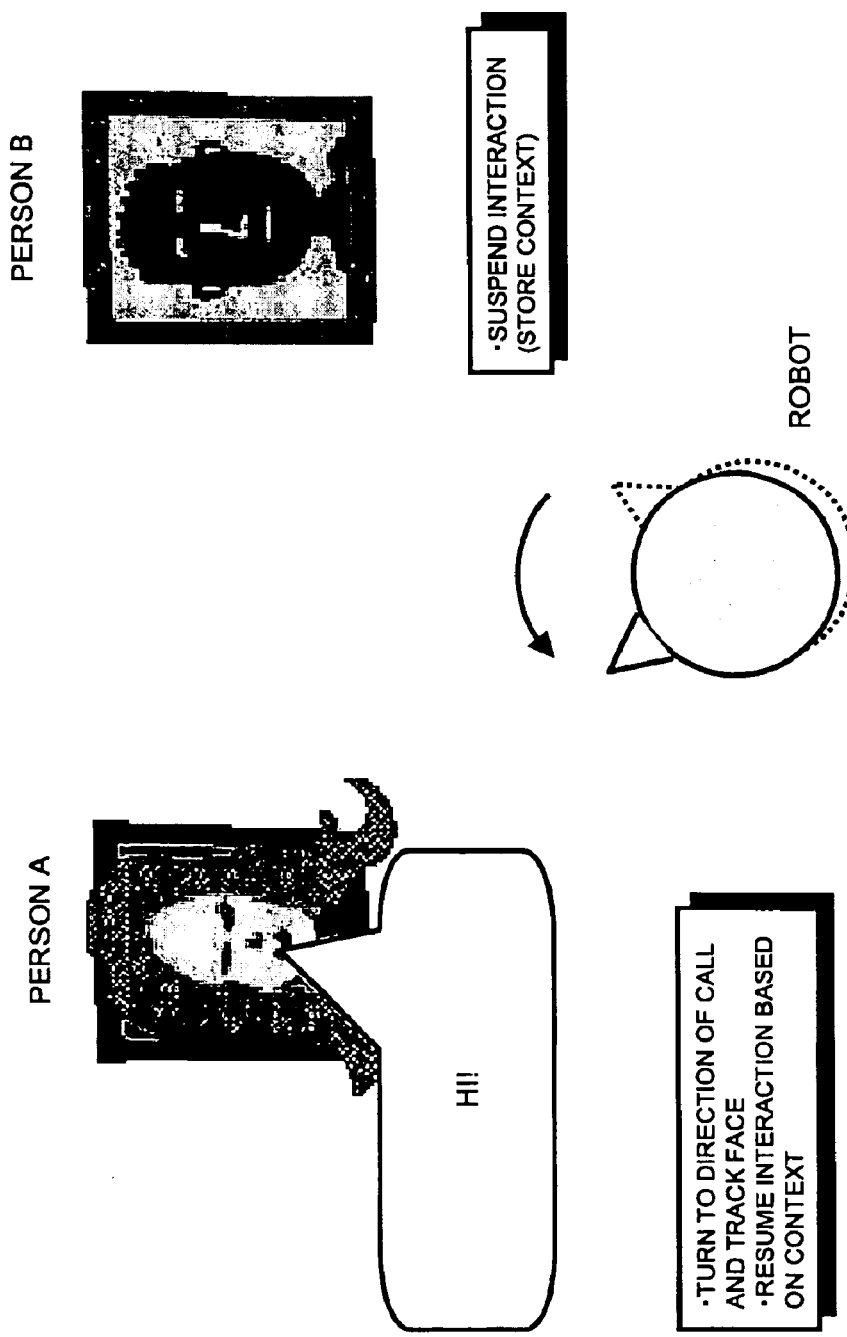
FIG. 16 is a diagram showing an example of interaction processing of the robot 100 with the users A and B.

The following describes interaction processing by the robot 100 with users A and B, with reference to FIGS. 14 to 16.

First, when the user A calls by saying "Masahiro! (name of the robot)", as shown in FIG. 14, the recognition function units 51 to 53 execute detection of sound direction, speech recognition, and face discrimination, and the robot 100 turns to the direction of the call and executes situated behavior such as tracking the face of the user A or starting interaction with the user A.

Then, when the user B calls by saying "Masahiro! (name of the robot)", as shown in FIG. 15, the recognition function units 51 to 53 execute detection of sound direction, speech recognition, and face discrimination, and the robot 100 suspends interaction with the user A (context of conversation is stored), turns to the direction of the call, and executes situated behavior such as tracking the face of the user B or starting interaction with the user B.

Then, when the user A shouts "Hi!" to prompt continuation of the conversation, as shown in FIG. 16, the robot suspends interaction with the user B (context of the conversation is stored) this time, turns to the direction of the call, and executes situated behavior such as tracking the face of the user A or resuming interaction with the user A based on the context stored.

Supplement

Although the present invention has been described hereinabove in the context of a specific embodiment, it will be readily understood that modifications or alternatives of the embodiment can be made by those skilled in the art without departing from the spirit of the present invention.

The present invention, in its essence, is not necessarily limited to products referred to as "robots". That is, the present invention may be applied similarly to machine apparatuses that operate in manners simulating human operations by electric or magnetic effect, even if the products belong to other industrial fields such as toys.

That is, the present invention has been disclosed by way of examples, and disclosure in this specification should not be construed as limiting. The gist of the present invention must be determined based on the section of Claims at the beginning.

Industrial Applicability

According to the present invention, a favorable autonomous robot apparatus that is capable of recognizing information of external environment, such as image and sound, and reflecting the information on its own behavior, and also a control method therefor, are provided.

Furthermore, according to the present invention, a favorable robot apparatus in which a plurality of results of recognition from external environment is integrated and handled as meaningful symbol information, allowing sophisticated behavior control, and a control method therefor, are provided.

Furthermore, according to the present invention, a favorable robot apparatus that is capable of determining which flesh-colored region is a face and corresponds to which person, which person has uttered this voice, etc., using more complex recognition results such as association with previously observed recognition results, and a control method therefor, are provided.

A robot apparatus according to the present invention integrates individual recognition results that are received asynchronously and then passes the integrated information to a behavior module. Accordingly, handling of information in the behavior module is facilitated.

Furthermore, a robot apparatus according to the present invention stores information regarding recognized observation results as a memory. Thus, even if observation results are temporarily missing during autonomous behavior, it appears to an upper module such as an application for controlling behavior of the apparatus body that items are constantly there in perception. Accordingly, a stable system that is less susceptible to recognizer errors and sensor noise and that does not depend on timing of notifications by recognizers is implemented.

Furthermore, a robot apparatus according to the present invention is allowed to determine its behavior using related information in an upper module such as an application since related recognition results are associated with each other. For example, the robot apparatus is allowed to retrieve a name of a person based on a calling voice, and is thus capable of responding to a greeting by saying "Hello, XXX."

Furthermore, since a robot apparatus holds information regarding outside of the vision of a sensor instead of immediately forgetting it, even if the robot once lose sight of an item, the robot is able to find the item later.

Furthermore, in a robot apparatus according to the present invention, even if information is insufficient from the viewpoint of a single recognizer alone, other recognition results sometimes compensate for the insufficiency, so that recognition performance of the system as a whole is improved.

What is claimed is:

1. A robot apparatus that operates in accordance with input information, comprising:
   a plurality of recognition means for recognizing external environment;
   target detecting means for detecting a target of perception by integrating recognition results from the plurality of recognition means for each target of perception, based on temporal and/or spatial relationship;
   a target memory for storing each target detected by the target detecting means; and
   behavior determining means for determining behavior of the robot apparatus based on each target stored in the target memory.

2. A robot apparatus according to claim 1,
   wherein the target is described in terms of a plurality of recognition attributes.

3. A robot apparatus according to claim 1,
   wherein the plurality of recognition attributes includes at least color information, voice information, and pattern information.

4. A robot apparatus according to claim 1,
   wherein the target is a robot coordinate system that is set at a predetermined position of the robot apparatus.

5. A robot apparatus according to claim 1,
   further comprising a garbage collector for deleting the target based on a predetermined condition.

6. A robot apparatus according to claim 1,
   further comprising target associating means for determining relevance among the plurality of targets and linking targets with a high relevance with each other.

7. A robot apparatus according to claim 1,
   further comprising an event memory for storing events generated in the external environment, in a time series, together with related target information,
   wherein the behavior determining means determines behavior based on a target stored in the target memory and an event stored in the event memory.

8. A robot apparatus according to claim 1,
   wherein the event includes one of appearance or disappearance of the target, a recognized word of speech, a conversation, and a result of an own behavior of the robot apparatus.

9. A method of controlling a robot apparatus that operates in accordance with input information, the method comprising:
   a plurality of recognition steps of recognizing external environment;
   a target detecting step of detecting a target of perception by integrating recognition results in the plurality of recognition steps for each target of perception, based on temporal and/or spatial relationship;
   a target storing step of storing each target detected in the target detecting step; and
   a behavior determining step of determining behavior of the robot apparatus based on each target stored in the target storing step.

10. A method of controlling a robot apparatus according to claim 9,
    wherein the target is described in terms of a plurality of recognition attributes.

11. A method of controlling a robot apparatus according to claim 9,
    wherein the plurality of recognition attributes includes at least color information, voice information, and pattern information.

12. A method of controlling a robot apparatus according to claim 9, wherein the target is a robot coordinate system that is set at a predetermined position of the robot apparatus.

13. A method of controlling a robot apparatus according to claim 9, further comprising a garbage collecting step of deleting the target based on a predetermined condition.

14. A method of controlling a robot apparatus according to claim 9, further comprising a target associating step of determining relevance among the plurality of targets and linking targets with a high relevance with each other.

15. A method of controlling a robot apparatus according to claim 9, further comprising an event storing step of storing events generated in the external environment, in a time series, together with related target information, wherein behavior is determined in the behavior determining step based on a target stored in the target storing step and an event stored in the event storing step.

16. A method of controlling a robot apparatus according to claim 9, wherein the event includes one of appearance or disappearance of the target, a recognized word of speech, a conversation, and a result of an own behavior of the robot apparatus.

* * * * *